(12) United States Patent
Falk et al.

(10) Patent No.: US 10,795,403 B2
(45) Date of Patent: Oct. 6, 2020

(54) DEVICE, METHOD AND SYSTEM FOR DETECTING AND RESOLVING TIME INFORMATION OF DIFFERENT ADMINISTRATIVE DOMAINS

(71) Applicant: Siemens Aktiengesellschaft, Munich (DE)

(72) Inventors: Rainer Falk, Poing (DE); Kai Fischer, Baldham (DE); Steffen Fries, Baldham (DE); Wolfgang Klasen, Ottobrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 55 days.

(21) Appl. No.: 15/560,209

(22) PCT Filed: Mar. 17, 2016

(86) PCT No.: PCT/EP2016/055813
§ 371 (c)(1),
(2) Date: Sep. 21, 2017

(87) PCT Pub. No.: WO2016/150814
PCT Pub. Date: Sep. 29, 2016

(65) Prior Publication Data
US 2018/0052485 A1 Feb. 22, 2018

(30) Foreign Application Priority Data
Mar. 25, 2015 (DE) .................. 10 2015 205 406

(51) Int. Cl.
*G06F 1/14* (2006.01)
*H04J 3/06* (2006.01)
*H04L 12/24* (2006.01)

(52) U.S. Cl.
CPC .............. *G06F 1/14* (2013.01); *H04J 3/0638* (2013.01); *H04J 3/0664* (2013.01);
(Continued)

(58) Field of Classification Search
CPC ... H04W 56/00; H04W 56/001; H04J 3/0617; H04J 3/0626; H04J 3/0682; H04L 1/205
(Continued)

(56) References Cited

U.S. PATENT DOCUMENTS 6,847,826 B1 * 1/2005 Wesby .................. H04J 3/0652
455/502
6,975,653 B2 12/2005 Eidson
(Continued)

FOREIGN PATENT DOCUMENTS

CN 102739626 A 10/2012
CN 103634091 A 3/2014
(Continued)

OTHER PUBLICATIONS

Ferrari, Paolo et al.; "Architecture of an embedded time gateway between PTP and SNTP"; Industrial Embedded Systems (SIES); 6th IEE International Symposium on; IEEE; Jun. 15, 2011; pp. 71-74.
(Continued)

*Primary Examiner* — Mahran Y Abu Roumi
(74) *Attorney, Agent, or Firm* — Schmeiser, Olsen & Watts LLP (57) ABSTRACT

A device is provided for detecting time information of different administrative domains. The device includes a plurality of detection units, wherein each detection unit is assigned to one of the administrative domains and is configured to receive time information from a timer of the assigned administrative domains for synchronising with the assigned administrative domains, a storage device having a plurality of storage areas, and a plurality of control units,
(Continued)

wherein each control unit is assigned exclusively to one of the detection units and the control units are configured to detect, synchronised with one another, a respective most recent item of the received time information of the respective assigned detection unit and to store the synchronously detected time information of the plurality of detection units together as synchronised data in one of the storage regions.

14 Claims, 6 Drawing Sheets

(52) U.S. Cl.
CPC .......... *H04J 3/0667* (2013.01); *H04J 3/0673* (2013.01); *H04J 3/0644* (2013.01); *H04L 41/50* (2013.01)

(58) Field of Classification Search
USPC ........................................................ 709/248
See application file for complete search history.

(56) References Cited

U.S. PATENT DOCUMENTS

| | | | | |
|---|---|---|---|---|
| 8,401,007 | B2* | 3/2013 | Thavisri | H04L 12/66 370/256 |
| 9,058,135 | B1* | 6/2015 | Schumacher | G06F 1/12 |
| 2009/0204811 | A1* | 8/2009 | Fries | H04L 63/123 713/160 |
| 2010/0074278 | A1* | 3/2010 | Dobjelevski | H04J 3/0673 370/503 |
| 2010/0242105 | A1 | 9/2010 | Harris et al. | |
| 2012/0117621 | A1 | 5/2012 | Kondamuru et al. | |
| 2012/0167226 | A1 | 6/2012 | Van Gestel et al. | |
| 2013/0279525 | A1* | 10/2013 | Zheng | H04J 3/0667 370/516 |
| 2013/0326088 | A1* | 12/2013 | Uchida | H04L 41/50 709/248 |
| 2014/0281037 | A1* | 9/2014 | Spada | H04J 3/0641 709/248 |
| 2016/0139625 | A1* | 5/2016 | Worrell | G06F 1/10 713/401 |
| 2016/0140066 | A1* | 5/2016 | Worrell | G06F 1/12 710/110 |
| 2017/0214514 | A1* | 7/2017 | Manohar | H04L 7/0037 |

FOREIGN PATENT DOCUMENTS

| | | |
|---|---|---|
| EP | 1014603 A2 | 6/2000 |
| JP | 2014183415 A | 9/2014 |
| KR | 20090059851 A | 6/2009 |
| KR | 20120068901 A1 | 6/2012 |
| KR | 20130070054 A | 6/2013 |

OTHER PUBLICATIONS

Ferrari, Paolo et al; "On the Seamless Interconnection of IEEE1588-Based Devices Using a Profinet IO Infrastructure"; IEEE Transactions on Industrial Informatics, vol. 6, No. 3, Aug. 2010; pp. 381-392; 2010.
Estrela, Pedro V. et al.; "Using a multi-source NTP watchdog to increase the robustness of PTPv2 in financial industry networks"; IEEE International Symposium on Precision Clock Synchronization for Measurement, Control and Communication (ISPCS); IEEE; Sep. 22, 2014; pp. 87-92.
Goetz, Franz Josef et al.; "Dual Time Scale in Factory & Energy Automation"; IEEE Draft; AS-GOETZ_IND_REQ_0712-V2; IEEE-SA; Piscataway; NJ USA; Bd. 802.1; Nr. v2; Jul. 16, 2012; pp. 1-26.
PCT International Search Report of International Searching Authority dated Jun. 7, 2016 corresponding to PCT International Application No. PCT/EP2016/055813 filed on Mar. 17, 2016.
English Translation of Korean Notice of Allowance for Application No. 10 2017 7030684, dated Jul. 31, 2019.
Paolo Ferrari et al: "On the Seamless Interconnection of IEEE1588-Based Devices Using a Profinet IO Infrastructure", IEEE Transactions on Industrial Informatics, IEEE Service Center, New York, NY, US, Bd. 6, No. 3, Aug. 1, 2010 (Aug. 1, 2010), pp. 381-392, XP011312327, ISSN: 1551-3203, p. 385, linke Spalte, Absatz 2—rechte Spalte, Absatz 3, Abbildungen 3,4,6; 2008.

* cited by examiner

DEVICE, METHOD AND SYSTEM FOR DETECTING AND RESOLVING TIME INFORMATION OF DIFFERENT ADMINISTRATIVE DOMAINS

CROSS-REFERENCE TO RELATED APPLICATIONS

This application claims priority to PCT Application No. PCT/EP2016/055813, having a filing date of Mar. 17, 2016, based off of German application No. 10 2015 205406.3 having a filing date of Mar. 25, 2015, the entire contents both of which are hereby incorporated by reference.

FIELD OF TECHNOLOGY

The following relates to a device and a method for detecting time information of different administrative domains in IT-based systems, as well as the system relating thereto.

BACKGROUND

Industry 4.0 denotes the penetration of manufacturing with information and communication technologies. The aim is to optimize the value creation and supply chains of a company. Hitherto largely independently run manufacturing stages had to be closely coordinated in terms of planning, control and monitoring of manufacturing processes.

In particular, this requires automated exchange of information between the individual manufacturing stages. In this way, the IT-based systems which are behind manufacturing and are organized in administrative domains undergo rudimentary integration via domain boundaries.

Here, time is often the only or most consistent information through which manufacturing events can be correlated. However, as a result of the different time sources, the varying precision of time sources, administrative reasons or simply due to faults, time differences between the administrative domains participating in the value creation chain are not unusual.

SUMMARY

An aspect relates to improving the detection and resolution of the time differences between administrative domains.

Accordingly a device for detecting time information of different administrative domains is proposed. The device comprises a plurality of detection units, wherein each detection unit is assigned to one of the administrative domains and is configured to receive time information from a timer of the assigned administrative domain for synchronizing with the assigned administrative domain. The device also comprises a storage device with a plurality of storage areas and a plurality of control units, wherein each control unit is assigned to precisely one of the detection units, wherein the control units are configured to detect, synchronously with one another, a respective most recent item of received time information of the respective assigned detection unit and to store the synchronously detected time information of the plurality of detection units together as synchronization data in one of the storage areas.

This enables time information of different administrative domains to be detected simultaneously and therefore also any time offset to be resolved at that time or at a later point in time. In particular, this is also possible when time synchronicity between the administrative domains is not desired or is not feasible as this constitutes an intervention in administrative responsibility. For example, in this way even a time-variant time offset can be resolved. The resolution of time differences between administrative domains also works, in particular, in the case of heterogeneous architectures. As in conventional time synchronization protocols, it is not the local time sources of the different domains that are to be synchronized. Embodiments of the invention provides a solution for the situation in which the time sources of different domains are not or cannot be synchronized.

In this way inter-domain planning and correction of sequences and processes is made possible in particular. The inter-domain traceability of sequences and processes will also be supported.

A time offset between administrative domains comes about systematically in particular, for example though administrative interventions, different time sources, varying precision of time sources or through faults.

Preferably each detection unit itself comprises a timer, which is to be synchronized to detect the time information of each assigned administrative domain with the timer thereof.

Here synchronous means coordinated in terms of time.

Resolution denotes translating one of two items of simultaneously detected time information to the other.

Timers in this case are functional units for producing time information. In particular the following can be considered as timers: time servers, broadcasting-based time sources (for example DCF77), satellite-supported time sources (for example global positioning system (GPS), GLONASS, GALILEO, BEIDOU) or radio-based time sources (for example mobile radio systems or broadcasting systems).

The synchronization of each of the detection units with their assigned administrative domains takes place, in particular, via time synchronization protocols such as the Network Time Protocol (NTP) or the Precision Time Protocol (PTP, IEEE 1588), via web protocols such as the Hypertext Transfer Protocol (HTTP) or the Constrained Application Protocol (CoAP), the Message Queuing Telemetry Transport (MQTT), Extensible Messaging and Presence Protocol (XMPP), IEEE C37.238 (use of the IEEE 1588 in the Power System domain) and suchlike.

Here, time information includes at least a time stamp of a timer.

More particularly, synchronization data comprise a plurality of items of time information.

Administrative domains constitute, in particular, sections of IT-based systems which are each subject to uniform administration. This includes, for example, the maintenance of a time server which determines the time decisive for the administrative domain.

The storage device is preferably a transient or non-transient solid-state memory, a hard disk memory or a combination thereof.

Storage areas are, in particular, addressable logic sections of the storage device.

The control unit is preferably a unit which controls certain processes as a function of a program and/or fixed wiring. The control unit can therefore be implemented in software and/or hardware.

According to one embodiment the control units are configured to detect, at a certain point in time of a reference period pre-determined by a reference time source, the respective most recent item of received time information of the respective assigned detection unit and to store the time information of the plurality of detection units detected at the certain point in time together with the certain point in time as synchronization data in the storage area.

This allows the time information of several administrative domains to be detected and thereby to solve a time offset at that time or at a later point in time.

The reference time source is, in particular, a highly precise time source, such as, for example, an atomic clock, itself derived from a standard time measure.

In this case the reference time is a standard time measure obtained from the reference time source.

The synchronization data include, in particular, time information of the relevant detected administrative domains, offset information (time offset) between time information, or also statistical information of the fluctuation of the offset information, for instance with regard to maximum value, mean value, variance, maximum deviation or suchlike.

Advantageously the latter allows it be determined whether reliable time information can be detected at all, which, in particular, requires a sufficiently small fluctuation in the offset information.

Preferably the synchronization data are cryptographically signed or verified with the relevant reference time so that later the authenticity of the detected time information can be checked.

According to a further embodiment the reference time source is in the form of a local reference time source of the device.

The local reference time source is, for example, a Chip Scale Atomic Clock (CSAC).

According to a further embodiment the reference time source is in the form of an external reference time source outside the device.

According to another embodiment the control units are configured to synchronize themselves with the reference time source.

Preferably higher synchronicity, i.e. more precise time coordination, of the control units amongst each other is brought about when detecting the most recent item of received time information.

According to yet another embodiment the control units are configured to detect a respective time offset between a time stamp of the timer of the assigned administrative domain and the reference time as time information and to store this at least as part of the synchronization data in the storage area.

An advantage of this is the lower storage requirement of a time offset compared with an absolute time, which has an effect particularly in the case of high-frequency detection of the synchronization data.

According to a further embodiment the device comprises a supply unit which is configured to provide the synchronization data of at least one external device.

Providing by the supply unit preferably takes place on request, in particular via a web service interface, or alternatively by broadcasting.

Such a request preferably includes a first item of information to indicate the time period or point in time to which providing relates. In addition, the request can include a second item of information which enables restricting the time information to be provided to a partial quantity of the administrative domains.

Broadcasting takes place preferably via a mobile radio system, for example Universal Mobile Telecommunications System (UTMS), Long Term Evolution (LTE), Code Division Multiple Access 2000 (CDMA2000), Worldwide Interoperability for Microwave Access (WiMAX) or suchlike, via a broadcasting system such as, for example, Digital Audio Broadcasting (DAB) or Digital Video Broadcast-Terrestrial (DVB-T) or via a satellite system (such as GPS, GALILEO, GLONASS, BEIDOU).

According to another embodiment the device comprises a supply unit which is configured to provide the synchronization data or an item of synchronization information derived from the synchronization data of at least one external device.

The derived synchronization information is, for example, a synchronization datum protected against manipulation with a cryptographic checking sum, such as a Message Authentication Code or a digital signature.

According to a further embodiment the device comprises a supply unit which is configured for receiving a request message for offset information between the time information of two of the administrative domains, which contains a first item of information indicating a transformation between a first administrative domain and a second administrative domain, and a second item of information indicating the period of time for the transformation, calculating the offset information as the difference between a first item of time information relating to the first administrative domain and a second item of time information relating to the second administrative domain as a function of the received request message and the stored synchronization data, and providing a reply message with the calculated offset information.

Transformation means translating one of two items of simultaneously detected time information into the other, wherein these items of time information are located, in particular, in an information context, for example a database or a log file with a defined data format.

According to another embodiment the supply device is configured to provide the stored synchronization data exclusively via a secure connection of the at least one external device. The secure connection is, in particular, an encrypted and/or integrity-protected connection.

Advantageously manipulations during data transfer are prevented by this.

Encryption takes place, for example, by means of Secure Socket Layer (SSL), Transport Layer Security (TLS), Internet Protocol Security (IPSec) or proprietary functions with an appropriate security level.

According to a further embodiment the at least one external device comprises at least one of the administrative domains.

Through this, administrative domains are enabled, for example, to themselves resolve the time offset to other administrative domains.

According to a further embodiment the time information includes a time stamp of the timer of the assigned administrative domain and identification information for the identification of the administrative domain assigned to the timer.

One advantage in particular is the subsequent traceability of the administrative domain assigned to the time stamp.

According to a further embodiment the identification information has a network address of the assigned administrative domain, a URL of the assigned administrative domain and/or a domain name of the assigned administrative domain.

In this way administrative domains can be integrated into heterogeneous architectures relating to detection of the time information.

According to a further embodiment the device comprises a translation device which is configured to translate a first item of time information relating to a first administrative domain of the plurality of the administrative domains by means of the stored synchronization data into a second item of time information relating to a second administrative domain of the plurality of administrative domains.

In this way a time offset, particularly between pairs of administrative domains or between different administrative domains and a reference time source, can be universally resolved.

According to a further embodiment the device comprises a transformation unit. This is configured to transform information time-related to a first administrative domain of the administrative domains into information time-related to a second administrative domain of the administrative domains. The transformation unit is configured to receive a first request message for the information time-related to the second administrative domain. This contains a first item of time information relating to the first administrative domain, a second item of time information relating to the second administrative domain and the information time-related to the first administrative domain. The transformation unit is also configured to send to the supply unit a second request message for a synchronization datum relating to the first administrative domain and the second administrative domain. This message contains the first item of time information, the second item of time information and information indicating a period of time for the transformation. The transformation unit is also configured to receive a first reply message from the supply unit with the synchronization datum which comprises a third item of time information relating to the first administrative domain and a fourth item of time information relating to the second administrative domain. Additionally the transformation unit is configured to provide a second reply message with the information time-related to the second administrative domain as a function of the information time-related to the first administrative domain and the received synchronization datum.

Advantageously, automated implementation of time-related information with a known data format, for example, log files or databases is made possible between administrative domains with regard to their time relationship.

Preferably the transmission of time-related information to be automatically implemented is cryptographically protected, in particular through encrypted and/or integrity-protected connections to the participating administrative domains.

The time-related information to be automatically implemented through the transformation unit is preferably cryptographically signed in order to verify the authenticity of the information from the first administrative domain.

In addition the information to be automatically implemented through the transformation unit is preferably cryptographically signed in order to be able to verify the authenticity of the information in the second administrative domain too.

The respective unit, for example the detection unit or control unit can be implemented in hardware and/or also software terms. In a hardware-related implementation the unit in question can be designed as a device or as part of a device, for example as a computer or as a microprocessor or as a control computer of a manufacturing control, a process control, a driverless transport system, a vehicle. In a software-related implementation the unit in question can be designed as a computer program product, as a function, as a routine, as part of a program code or as an implementable object.

A system is also proposed which comprises a plurality of different administrative domains, a device as described above for detecting time information of the administrative domains and a network for connecting the device to the administrative domains.

According to one embodiment the system comprises a transformation unit connected between a first and a second administrative domain. This is configured to transform an item of information time-related to the first administrative domain into an item of information time-related to the second administrative domain. The transformation unit is configured to receive the information time-related to the first administrative domain. It is also configured to send to the supply unit a request message for a synchronization datum relating to the first administrative domain and the second administrative domain. This message contains a first item of time information relating to the first administrative domain, a second item of time information relating to the second administrative domain and a third item of time information for indicting a time period for the transformation. In addition, the transformation unit is configured to receive from the supply unit a reply message with the synchronization datum, which includes a third item of time information relating to the first administrative domain and a fourth item of time information relating to the second administrative domain. Furthermore the transformation unit is configured to provide information time-related to the second administrative domain as a function of the information time-related to the first administrative domain and the received synchronization datum.

This allows the automated translation of time-related information with a known data format, for example log files or databases, with regard to their time relationship between two administrative domains connected to each other.

It is also advantageous that the inclusion of synchronization data in the transformation can compensate a time offset drift occurring between the first and the second administrative domain.

According to one embodiment time-related information of several administrative domains can be translated into time-related information of another administrative domain in an automated manner.

Preferably the time-related information is an absolute time of an administrative domain so that the transformation unit functions as a so-called boundary clock which via clock distribution is configured to resolve the time offset between the first and the second administrative domain.

According to a further embodiment the system comprises a supply unit, connected between the first and the second administrative domain, which is configured to receive a request message for offset information between a first item of time information relating to the first administrative domain and a second item of time information relating to the second administrative domain, wherein the request message contains information for indicating the time period for providing, to calculate the offset information as the difference between the first item of time information and the second item of time information as a function of the received request message and the stored synchronization data and to provide a reply message with the calculated offset information.

With this, offset information between the time information of the connected administrative domains can also be provided in a decentralized manner which particularly in the case of application scenarios with a high supply rate can prevent load peaks.

Also proposed is a method of detecting time information of different administrative domains, wherein each of the administrative domains has a timer for issuing time information for the administrative domain. The method comprises the following stages: Receipt of the time information of a respective timer of the administrative domains, synchronous detection of a respective most recent item of time information received from the timers, and storage of the synchronously detected time information together as synchronization data in a storage area of a storage device.

In addition, a computer program product is proposed which implements the above-described method on a program-controlled device.

A computer program product, for example a computer program medium can, for example, be provided or supplied as a storage medium, e.g. a memory card, UBS stick, CD-ROM, DVD or also in the form of a downloadable file from a server in a network. This can take place, for example, in a wireless communication network through the transfer of a corresponding file with the computer program product or the computer program medium.

The embodiments and features described for the proposed device apply for the proposed method accordingly.

Further possible implementations of the invention also include combinations of the above not explicitly set out above or in the following features or embodiments relating to the examples of embodiment. A person skilled in the art will also add individual aspects as improvements or supplements to the respective basis form of the invention.

BRIEF DESCRIPTION

Some of the embodiments will be described in detail, with references to the following figures, wherein like designations denote like members, wherein.

DETAILED DESCRIPTION

In the figures identical or functionally-equivalent elements are provided with same references numbers unless stated otherwise.

Figure 1:
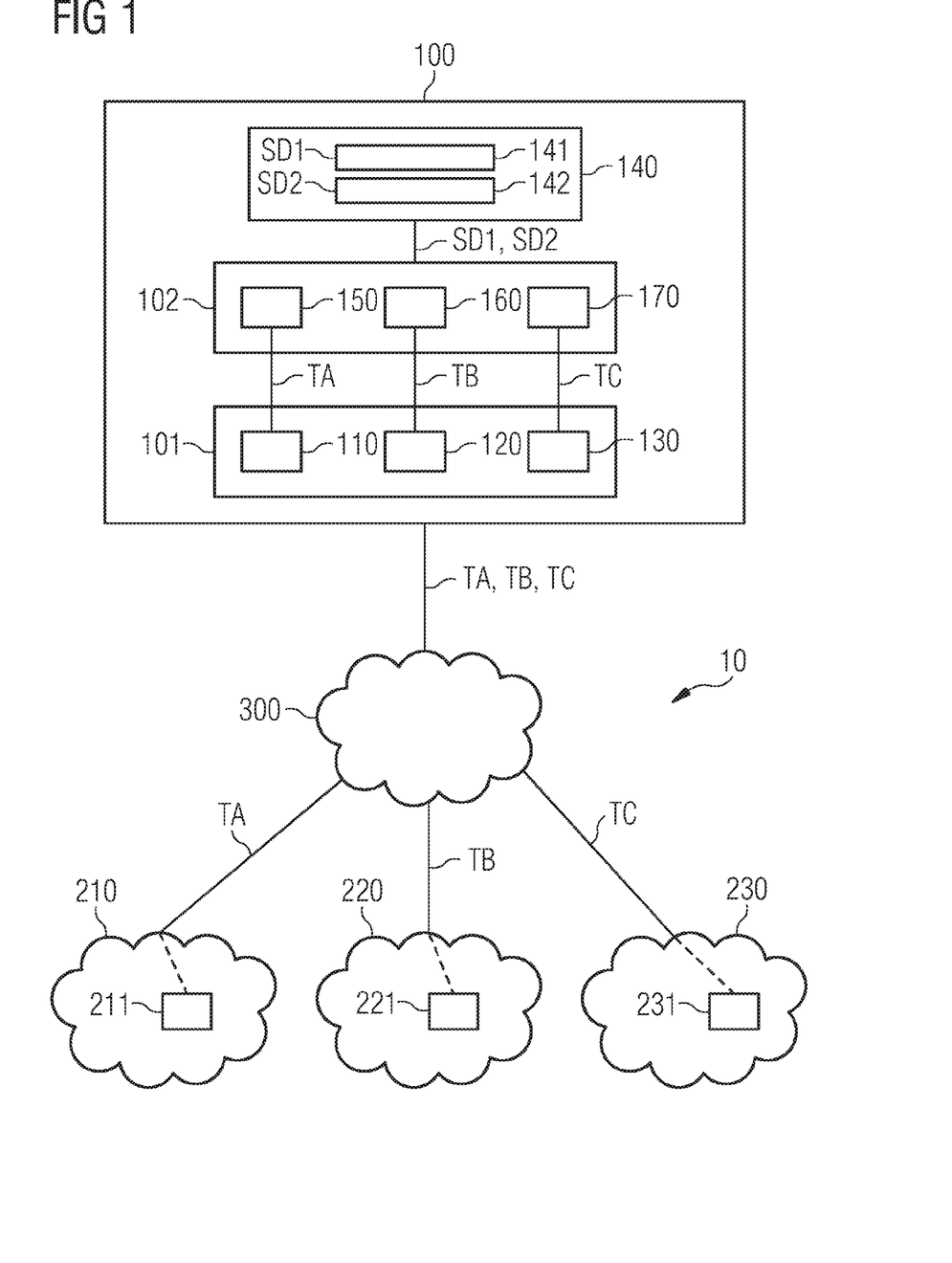
FIG. 1 shows a schematic view of a block circuit diagram of a first example of embodiment of a system with a device for detecting time information of different administrative domains.

FIG. 1 shows a schematic view of a block circuit diagram of a first example of embodiment of a system 10 with a device 100 for detecting time information TA, TB, TC of different administrative domains 210, 220, 230.

The system 10 also has a network 300 for connecting the device 100 to the administrative domains 210, 220, 230.

The device 100 comprises a plurality of detection units 110, 120, 130. These are each assigned to the administrative domains 210, 220, 230 and configured to receive time information TA, TB, TC from a timer 211, 221, 231 of the assigned administrative domains 210, 220, 230 for synchronization therewith. The device 100 also comprises a storage device 140 with a plurality of storage areas 141, 142 as well as plurality of control units 150, 160, 170 wherein the respective control unit 150, 160, 170 is assigned to precisely one of the detection units 110, 120, 130. The control units 150, 160, 170 are each configured to detect, synchronized with one another, a most recent item of the received time information TA, TB, TC of the respective assigned detection unit 110, 120, 130 and to store the synchronously detected time information TA, TB, TC of the plurality of detection units 110, 120, 130 together as synchronization data SD1, SD2 in one of the storage areas 141, 142.

Together, the plurality of detection units 110, 120, 130 forms a detection device 101, whereas the plurality of the control units 150, 160, 170 together forms a control device 102.

The time information TA, TB, TC preferably comprises a time stamp of the timer 211, 221, 231 of the assigned administrative domains 210, 220, 230 and identification information for the identification of the administrative domain 210, 220, 230 assigned to the timer 211, 221, 231.

Figure 2:
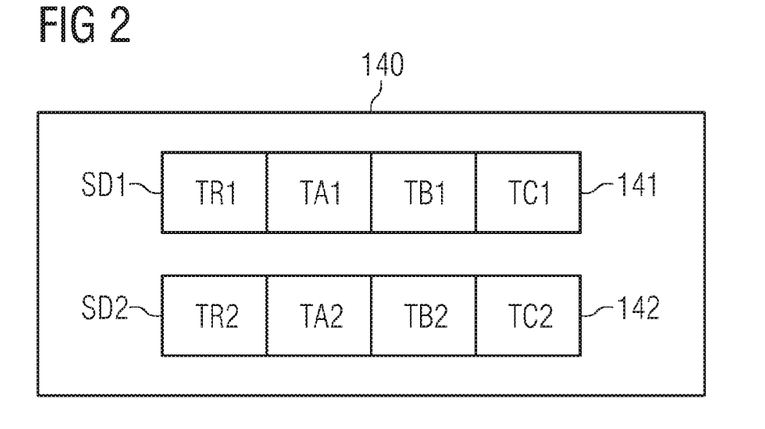
FIG. 2 shows a schematic view of a block circuit diagram of a first example of a storage device.

FIG. 2 shows a schematic view of a block circuit diagram of a first example of embodiment of the storage device 140 with the synchronization data SD1, SD2 which are stored in the respective storage areas 141, 142.

Each item of synchronization data SD1, SD2 comprises the time information TA1, TB1, TC1, TA2, TB2, TB3 of the plurality of detection units 110, 120, 130 detected at a certain point in time TR1, TR2, together with the certain point in time TR1, TR2. Preferably the control units 150, 160, 170 are configured to detect, at a certain point in time TR1, TR2 of a reference time determined by a reference time source (not shown), the respective most recent item of the received time information TA1, TB1, TC1, TA2, TB2, TC2 of the respective assigned detection unit 110, 120, 130.

The reference time source can be in the form of a local reference time source of the device 100 or alternatively in the form of an external reference time source outside the device 100.

The control units 150, 160, 170 are in particular configured to synchronize themselves with the reference time source.

Figure 3:
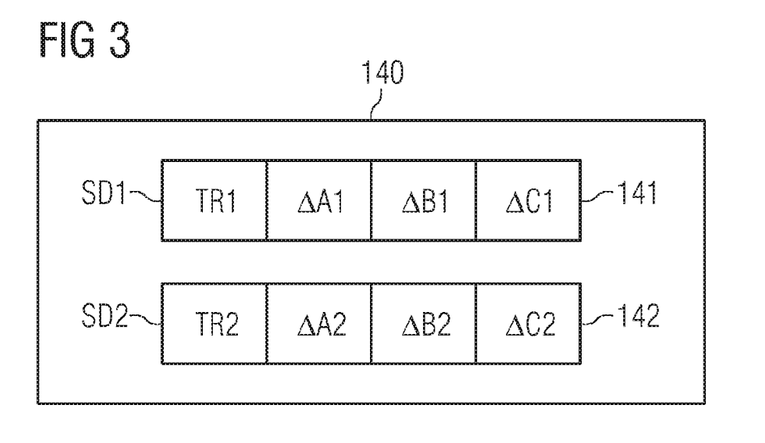
FIG. 3 shows a schematic view of a block circuit diagram of a second example of embodiment of the storage device.

FIG. 3 shows a schematic view of a block circuit diagram of a second example of embodiment of the storage device 140 in the event that the control units 150, 160, 170 are configured to detect a respective time offset AA1, AB1, AC1, AA2, AB2, AC2 between a time stamp TA1, TB1, TC1, TA2, TB2, TC2 of the timer 211, 221, 231 of the assigned administrative domain 210, 220, 230 and the reference time TR1, TR2 as time information, and together with the reference time TR1, TR2 store this at least as part of the synchronization data SD1, SD2 in the storage area 141, 142.

Figure 4:
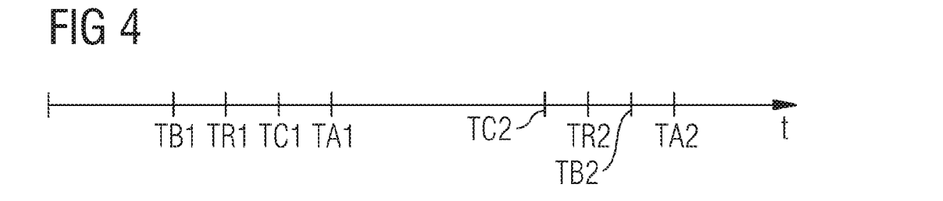
FIG. 4 shows a schematic view of a time line with several items of time information offset with regard to each other.

FIG. 4 shows a schematic view of a time line t with several items of offset time information TA1, TB1, TC1 which are grouped around the certain point in time TR1, as well as other offset items of time information TA2, TB2, TC2 which surround the certain point in time TR2.

From FIG. 4 in particular it can be seen that a time offset between an item of time information TA1, TB1, TC1, TA2, TB2, TC2 and the respective certain point in time TR1, TR2 can be time variant. As a rule the assigned administrative domains drift in terms of time relative to the reference time as well as relative to each other.

Figure 5:
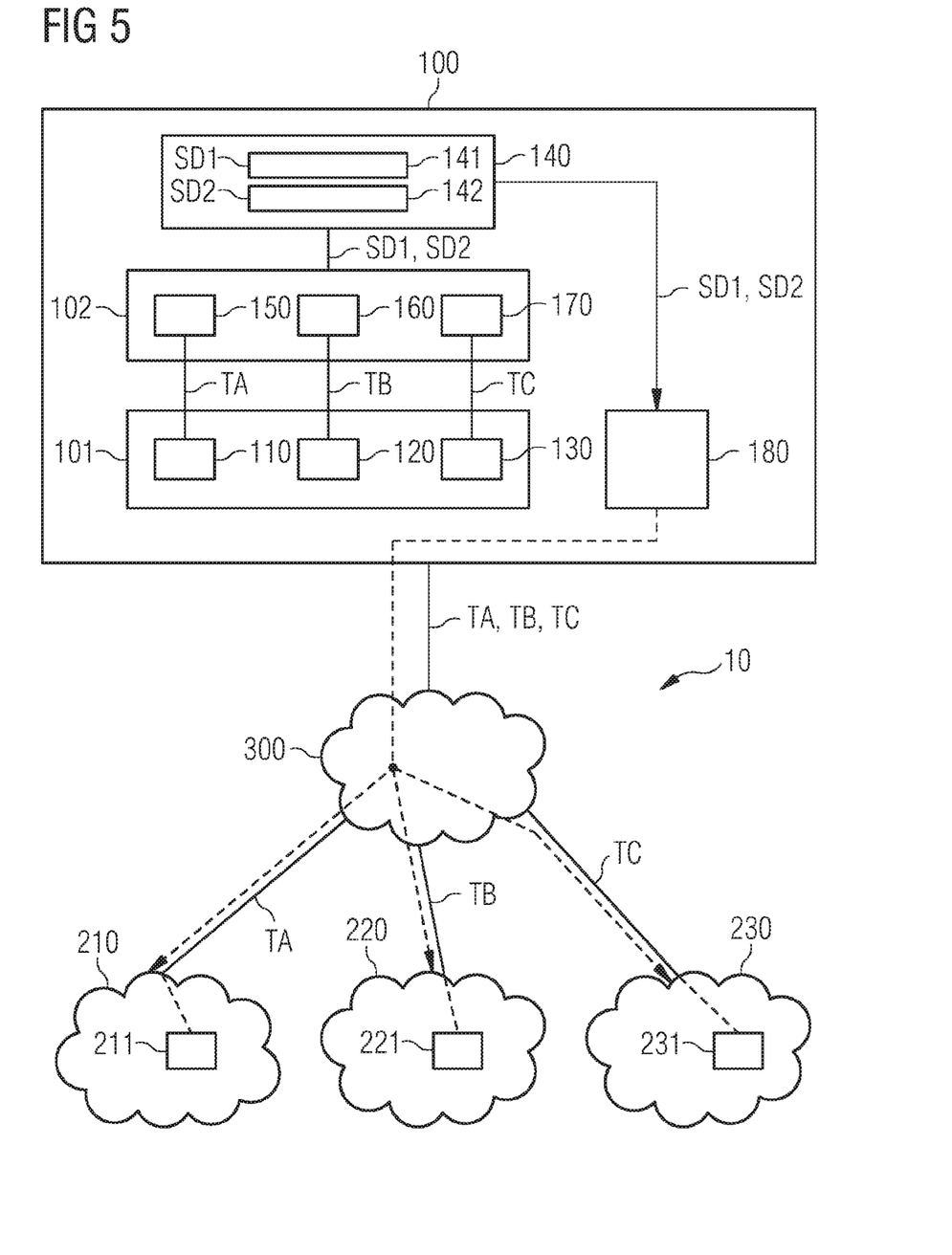
FIG. 5 shows a schematic view of a block circuit diagram of a second example of embodiment of the system with a supply unit.

FIG. 5 shows a schematic view of a block circuit diagram of a second example of embodiment of the system 10 with a supply unit 180.

The supply unit 180 is in particular configured to provide the synchronization data SD1, SD2 of at least one external device 210, 220, 230 stored in the storage device 140.

Preferably the at least one external device 210, 220, 230 is at least one of the administrative domains 210, 220, 230.

The supply unit 180 is preferably configured to also provide an item of synchronization information of the at least one external device 210, 220, 230 which has been derived from the synchronization data SD1, SD2.

Preferably the supply unit 180 is configured to provide the stored synchronization data SD1, SD2 exclusively via a secured connection, in particular via an encrypted and/or integrity-protected connection, of the at least one external device 210, 220, 230.

Figure 6:
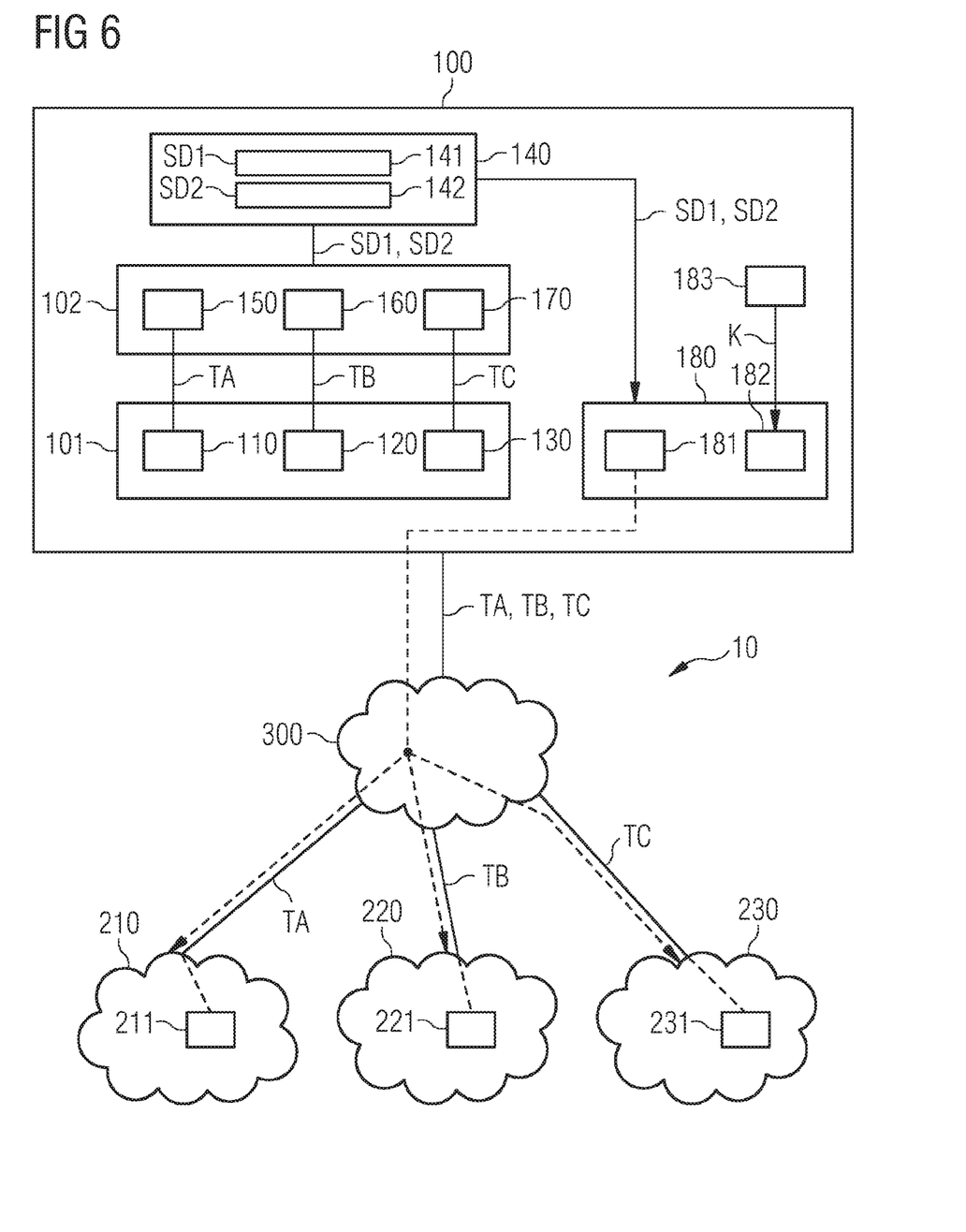
FIG. 6 shows a schematic view of a block circuit diagram of a third example of embodiment of the system with the supply unit.

FIG. 6 shows a schematic view of a block circuit diagram of a third example of embodiment of the system 10 with the supply unit 180.

Here, this has a translation unit 181 which, for example, is configured to translate a first item of time information TA relating to a first administrative domain 210 of the plurality of administrative domains 210, 220, 230 by way of the stored synchronization data SD1, SD2 into a second item of time information TB relating to a second administrative domain 220 of the plurality of administrative domains 210, 220, 230.

The supply unit 180 also has a transformation unit 182. The device 100 also comprises a storage unit 183 which is configured to provide the transformation unit 182 with a cryptographic key K. The transformation unit 182 will be described in more detail in FIGS. 7 and 8 below.

Figure 7:
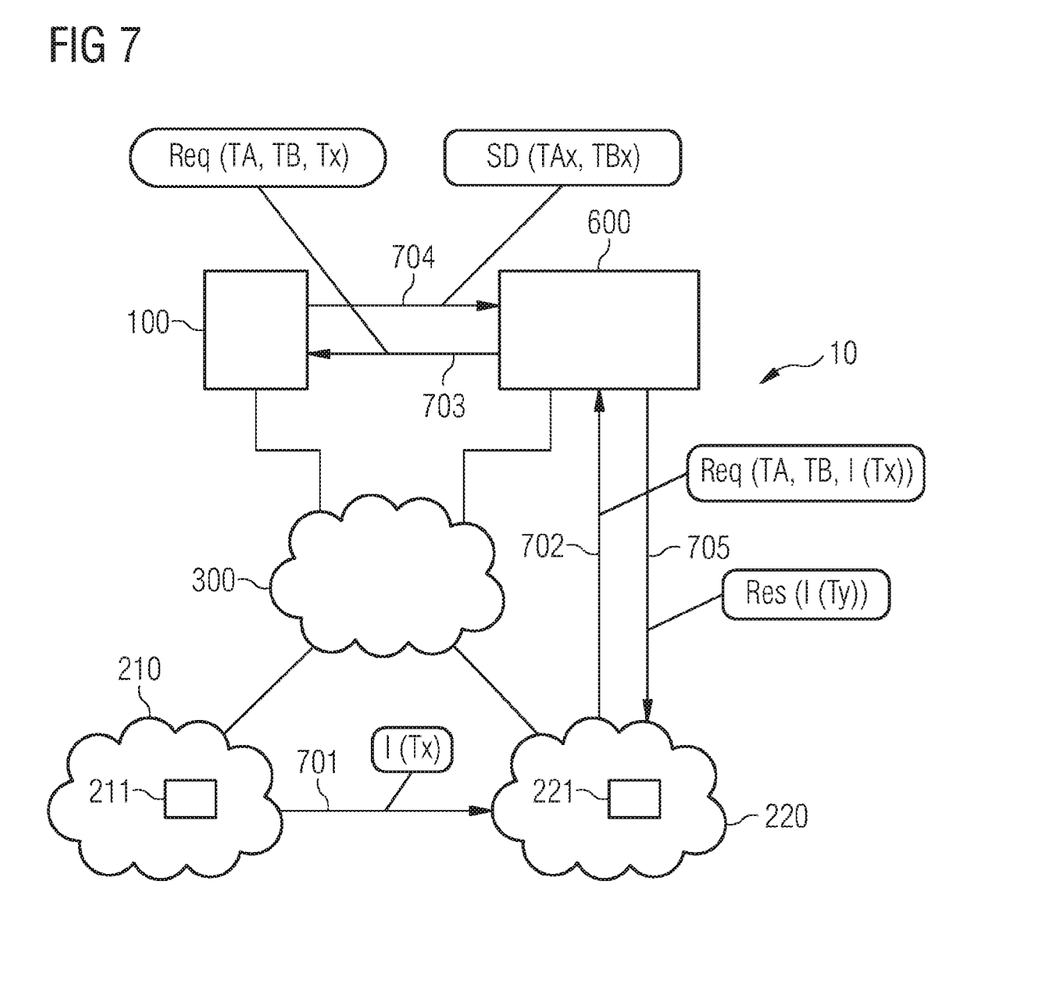
FIG. 7 shows a schematic view of a block circuit diagram of a fourth example of embodiment of the system with a transformation unit set apart from the device.

FIG. 7 shows a schematic view of a block circuit diagram of a fourth example of embodiment of the system 10 with a transformation unit 600 set apart from the device 100.

Here, the system 10 has a first administrative domain 210 with the timer 211 and a second administrative domain 220 with the timer 221, wherein the administrative domains 210, 220 are connected to each other via the network 300 and with the device 100.

The transformation device 600 set apart from the device 100 is also connected via the network 300 with the device 100 and the administrative domains 210, 220.

The transformation device 600 of this example of embodiment provides external devices, such as in particular the administrative domains 210, 220, with a central service for transformation of information I (Tx) time-related to the first administrative domain 210 into information I (Ty) time-related to the second administrative domain 220 (and vice versa).

In a message 701 the second administrative domain 220 initially receives here the information I (Tx) time-related to the first administrative domain 210, for the transformation of which it uses the aforementioned service.

Accordingly the transformation unit 600 receives a first request message Req 702 for the information I (Ty) time-related to the second administrative domain 220, wherein the first request message preferably contains a first item of time information TA relating to the first administrative domain 210, a second item of time information TB relating to the second administrative domain 220 and the information I (Tx) time-related to the first administrative domain 210.

As a consequence or at intervals the transformation unit 600 sends a second request message Req 703 for a synchronization datum SD relating to the first administrative domain 210 and the second administrative domain 220 to the supply unit 180 in the device 100. Preferably the second request message Req 703 contains the first item of time information TA, the second item of time information TB and information for indicating a period of time Tx for the transformation.

As a result the transformation unit 600 receives a first reply message 704 with the synchronization datum SD from the supply unit 180 of the device 100. Preferably the first reply message 704 includes a third item of time information TAx relating to the first administrative domain 210 and a fourth item of time information TBx relating to the second administrative domain 220.

Finally a second reply message Res 705 is provided by the transformation unit 600 with the information I(Ty) time-related to the second administrative domain 220, wherein the time-related information I(Ty) is based on information I(Tx) time-related to the first administrative domain 210 and the received synchronization datum SD.

Figure 8:
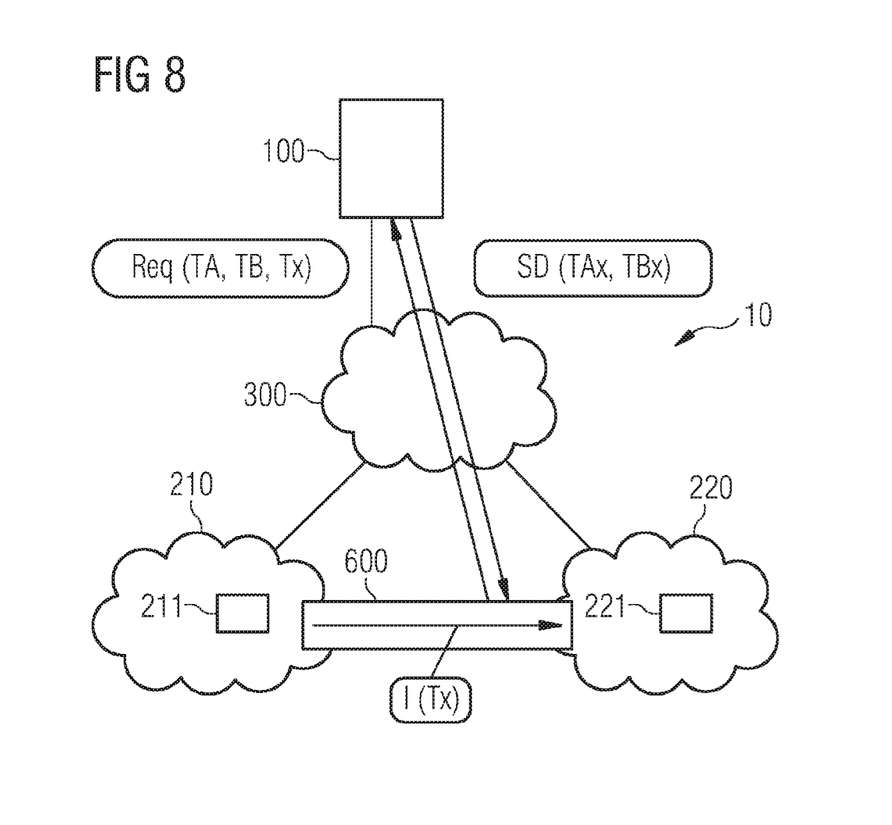
FIG. 8 shows a schematic view of a block circuit diagram of a fifth example of embodiment of the system with a transformation unit to be connected between administrative domains.

FIG. 8 shows a schematic view of a block circuit diagram of a fifth example of embodiment of the system 10 with a transformation unit 600 connected between the administrative domains 210, 220.

The transformation unit 600 of this example of embodiment provides in particular the connected administrative domains 210, 220 with a decentralized service for the transformation of information I(Tx) time-related to the first administrative domain 210 into information I(Ty) time-related to the second administrative domain 220 (and vice versa).

From the first administrative domain 210 the transformation unit 600 initially receives the information I(Tx) time-related to thereto.

Consequently or at intervals the transformation unit 600 sends a request message Req to the supply unit 180 in the device 100 for a synchronization datum SD relating to the first administrative domain 210 and the second administrative domain 210. Preferably the request message Req contains a first item of time information TA relating to the first administrative domain 210, a second item of time information TB relating to the second administrative domain 220 and a third item of time information Tx for indicating a time period for the transformation.

In return the transformation unit 600 receives a reply message with the synchronization datum SD from the supply unit 180 of the device 100. Preferably the reply message contains a third item of time information TAx relating to the first administrative domain 210 and a fourth item of time information TBx relating to the second administrative domain 220.

With this information the transformation unit 600 can resolve a time offset between the two connected administrative domains 210, 220. It thus provides the second administrative domain 220 with an item of information I(Tx) time-related thereto as a function of the information I(Tx) time-related to the first administrative domain 210 and the received synchronization datum SD.

Figure 9:
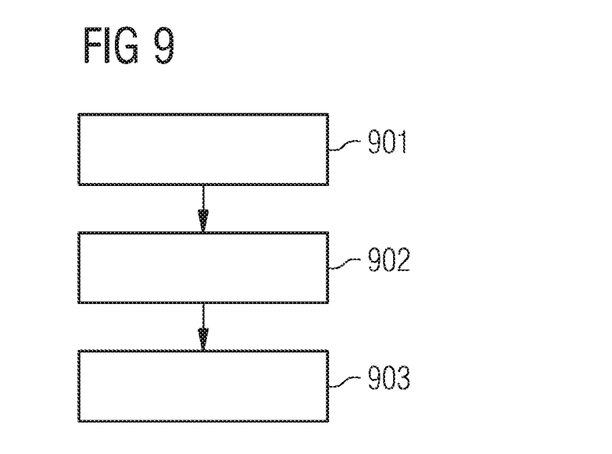
FIG. 9 shows a schematic view of a flow diagram of an example of embodiment of a method for detecting time information of different administrative domains.

FIG. 9 shows a schematic view of a flow diagram of an example of embodiment of a method for detecting time information TA, TB, TC of various administrative domains 210, 220, 230.

Each of the administrative domains 210, 220, 230 includes a timer 211, 221, 231 for issuing time information TA, TB, TC for the respective administrative domain 210, 220 230.

The method comprises the steps 901 to 903.

In step 901 the time information TA, TB, TC is received from a respective timer 211, 221, 231 of the administrative domains 210, 220, 230.

In step 902 the most recent of the items of time information TA, TB, TC received from the timers 211, 221, 231 is synchronously detected.

In step 903 the synchronously detected time information TA, TB, TC is stored together as synchronization data SD1, SD2 in a storage area 141, 142 of a storage device 140.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The claims are as follows:

1. A device for detecting time information of different administrative domains comprising:
   a plurality of detection units each capable of being connected over a network to a different administrative domain, such that each detection unit of the plurality of detection units is assigned to one of the different administrative domains and is configured to receive time information from a timer of the assigned administrative domain over the network and synchronize with the timer of the assigned administrative domain;
   a storage device with a plurality of storage areas;
   a plurality of control units wherein each control unit of the plurality of control units is assigned to precisely one detection unit of the plurality of detection units, the plurality of control units being configured to detect, synchronously with one another, at a certain point in time of a reference period predetermined by a reference time source, a respective most recent item of received time information of the respective assigned detection unit and to store the synchronously detected time information of the plurality of detection units together as synchronization data in one of the plurality of storage areas;
   a supply unit which is configured to provide the synchronization data of at least one external device; and
   a translation unit which is configured to translate a first item of time information relating to a first administrative domain of the plurality of administrative domains by way of the stored synchronization data into a second item of time information relating to a second administrative domain of the plurality of administrative domains and provide translations to an external device over the network,
   wherein the plurality of detection units, the plurality of control units, the supply unit and the translation unit are each implemented in hardware.

2. The device as claimed in claim 1, wherein
   the plurality of control units are configured to detect and to store the time information of the plurality of detection units detected at the certain point in time together with the certain point in time as synchronization data in the storage area.

3. The device as claimed in claim 2, wherein
   the reference time source is in the form of a local reference time source of the device or in the form of an external reference time source outside the device.

4. The device as claimed in claim 2, wherein
   the plurality of control units are configured to synchronize themselves with the reference time source.

5. The device as claimed in claim 4, wherein
   the plurality of control units are configured to detect a respective time offset between a time stamp of the timer of the assigned administrative domain and the reference time as time information and store this at least as part of the synchronization data in the storage area.

6. The device as claimed in claim 1, further comprising:
   the supply unit which is configured to provide the synchronization data or an item of synchronization information derived from the synchronization data of at least one external device.

7. The device as claimed in claim 1, wherein
   the supply unit is configured to provide the stored synchronization data exclusively via an encrypted and/or integrity-protected connection of the at least one external device.

8. The device as claimed in claim 1, wherein
   the at least one external device comprises at least one of the administrative domains.

9. The device as claimed in claim 1, wherein
   the time information includes a time stamp of the timer of the assigned administrative domain and identification information for the identification of the administrative domain assigned to the timer.

10. The device as claimed in claim 1, further comprising:
    a transformation unit implemented in hardware which is configured to transform information time-related to a first administrative domain of the administrative domains into information time-related to a second administrative domain of the administrative domains, wherein the transformation unit is configured:
    to receive a first request message for the information time-related to the second administrative domain which contains a first item of time information relating to the first administrative domain, a second item of time information relating to the second administrative domain and the information time-related to the first administrative domain,
    to send to the supply unit a second request message for a synchronization datum relating to the first administrative domain and the second administrative domain which contains the first item of time information, the second item of time information and information indicating a period of time for the transformation,
    to receive a first reply message from the supply unit with the synchronization datum, which comprises a third item of time information relating to the first administrative domain and a fourth item of time information relating to the second administrative domain, and
    to provide a second reply message with the information time-related to the second administrative domain as a function of the information time-related to the first administrative domain and the received synchronization datum.

11. A system comprising:
a plurality of different administrative domains;
the device for detecting time information of the administrative domains as claimed in claim 1; and
a network for connecting the device to the administrative domains.

12. The system as claimed in claim 11, further comprising:
a transformer unit implemented in hardware connected between a first and a second administrative domain which is configured to transform an item of information time-related to the first administrative domain into an item of information time-related to the second administrative domain, wherein the transformer unit is configured:
to receive information time-related to the first administrative domain,
to send to the supply unit a request message for a synchronization datum relating to the first administrative domain and the second administrative domain which contains a first item of time information relating to the first administrative domain, a second item of time information relating to the second administrative domain and a third item of time information for indicting a time period for the transformation,
to receive from the supply unit a reply message with the synchronization datum which contains a third item of time information relating to the first administrative domain and a fourth item of time information relating to the second administrative domain, and
to provide information time-related to the second administrative domain as a function of the information time-related to the first administrative domain and the received synchronization datum.

13. A method of detecting time information of different administrative domains, wherein each of the administrative domains has a timer for issuing time information for each of the administrative domains associated with a respective detection unit of a device, comprising the steps:
receiving, by the respective detection units of the device over a network, the time information of a respective timer of each of the associated administrative domains for synchronization with the time of each of the associated administrative domain;
synchronously, at a time of a reference time predetermined by a reference time source, detecting, by the device, a respective most recent item of time information received from the respective timers over the network,
storing, by the device, of the synchronously detected time information together as synchronization data in a storage area of a storage device of the device;
providing, by a supply unit of the device, the synchronization data to at least one external device; and
translating, by a translation unit of the device, a first item of time information relating to a first administrative domain of the plurality of administrative domains by way of the stored synchronization data into a second item of time information relating to a second administrative domain of the plurality of administrative domains and provide translations to the external device over the network.

14. A device comprising a processor and a memory for detecting time information of different administrative domains, the device configured to implement the method of claim 13.

* * * * *